US011975947B2

(12) United States Patent
Van Leeuwen et al.

(10) Patent No.: US 11,975,947 B2
(45) Date of Patent: May 7, 2024

(54) LIFTING DEVICE AND A METHOD OF LIFTING A TUBULAR PILE

(71) Applicant: IHC HOLLAND IE B.V., Sliedrecht (NL)

(72) Inventors: Jeroen Pieter Hendrik Van Leeuwen, Sliedrecht (NL); Harm Daniël Van Der Laan, Sliedrecht (NL)

(73) Assignee: IQIP HOLDING B.V. (NL)

( * ) Notice: Subject to any disclaimer, the term of this patent is extended or adjusted under 35 U.S.C. 154(b) by 216 days.

(21) Appl. No.: 17/616,119

(22) PCT Filed: Jul. 2, 2020

(86) PCT No.: PCT/NL2020/050435

§ 371 (c)(1),
(2) Date: Dec. 2, 2021

(87) PCT Pub. No.: WO2021/002750

PCT Pub. Date: Jan. 7, 2021

(65) Prior Publication Data

US 2022/0242702 A1 Aug. 4, 2022

(30) Foreign Application Priority Data

Jul. 4, 2019 (NL) ..................................... 2023436

(51) Int. Cl.

*B66C 1/44* (2006.01)
*B66C 1/56* (2006.01)
*E02D 13/00* (2006.01)

(52) U.S. Cl.

CPC ................ *B66C 1/56* (2013.01); *B66C 1/447* (2013.01); *E02D 13/00* (2013.01)

(58) Field of Classification Search

CPC .. B66C 1/54; B66C 1/56; B66C 1/447; E21B 23/0421; E21B 31/20; B25J 15/0047; E02D 13/00

(Continued)

(56) References Cited

U.S. PATENT DOCUMENTS

| | | | | |
|---|---|---|---|---|
| 1,779,123 A | | 10/1930 | Gates | |
| 2,203,799 A | * | 6/1940 | Shaffer | H01F 7/206 294/93 |

(Continued)

FOREIGN PATENT DOCUMENTS

| | | |
|---|---|---|
| CN | 107635905 A | 1/2018 |
| CN | 109502476 A | 3/2019 |
| WO | 2014084738 A1 | 6/2014 |

OTHER PUBLICATIONS

International Search Report and Written Opinion for corresponding International application No. PCT/NL2020/050435; dated Sep. 30, 2020 (13 pages).

(Continued)

*Primary Examiner* — Dean J Kramer

(74) *Attorney, Agent, or Firm* — Mendelsohn Dunleavy P.C.

(57) ABSTRACT

A lifting device for lifting a tubular pile comprises a hoisting member including a centreline, a plurality of engagement elements which are moveably mounted to the hoisting member at angular distance with respect to each other about the centreline and actuators for moving the respective engagement elements with respect to the hoisting member. The engagement elements are moveable in longitudinal direction of the centreline along respective guides of the hoisting member. The guides are inclined with respect to the centreline such that the engagement elements move in radial direction of the centreline when being moved in longitudinal direction of the centreline. The actuators are functionally interconnected such that under operating conditions the actuators move the engagements elements simultaneously until a first one of the actuators reaches a counterforce which is higher than a counterforce of a second one of the actuators, after which the second one of the actuators is moved further.

18 Claims, 3 Drawing Sheets

(58) Field of Classification Search
USPC ........................ 294/195, 86.15, 86.24, 86.25
See application file for complete search history.

(56) References Cited

U.S. PATENT DOCUMENTS

| | | | | | |
|---|---|---|---|---|---|
| 2,286,365 | A * | 6/1942 | Lane | F04B 47/00 | 166/212 |
| 3,638,989 | A * | 2/1972 | Sandquist | E21B 23/04 | 166/212 |
| 4,235,469 | A | 11/1980 | Denny et al. | | |
| 4,773,689 | A * | 9/1988 | Wolters | E21B 19/07 | 294/195 |
| 6,142,545 | A * | 11/2000 | Penman | E21B 19/00 | 294/86.15 |
| 8,434,969 | B2 * | 5/2013 | White | E02D 5/285 | 405/249 |
| 9,580,882 | B2 * | 2/2017 | Mulderij | E02D 13/04 | |

OTHER PUBLICATIONS

Office Action for corresponding Taiwanese application No. 109121776; dated Sep. 6, 2023 (25 pages) Machine Translation.

* cited by examiner

LIFTING DEVICE AND A METHOD OF LIFTING A TUBULAR PILE

The present invention relates to a lifting device for lifting a tubular pile, comprising a hoisting member including a centreline, a plurality of engagement elements which are moveably mounted to the hoisting member at angular distance with respect to each other about the centreline and actuators for moving the respective engagement elements with respect to the hoisting member, wherein the engagement elements are moveable in longitudinal direction of the centreline along respective guides of the hoisting member, which guides are inclined with respect to the centreline such that the engagement elements move in radial direction of the centreline when being moved in longitudinal direction of the centreline.

Such a lifting device is known from WO 2014/084738. Under operating conditions the lifting device is inserted into an upper end of a tubular pile after which the engagement elements are moved outwardly towards an inner wall of the tubular pile such that they grip the pile. This allows the lifting device to lift the tubular pile. The known lifting device is suitable for gripping a pile which has an entirely or almost entirely circular cross-section. If a pile has an oval or slightly oval cross-section, or if the stiffness of the pile in different radial directions varies, one or more of the engagement elements may have insufficient grip for engaging an inner wall of the pile when the lifting device is inserted into an upper end of the pile.

The present invention aims to provide a lifting device which has a reliable gripping function.

For this purpose the actuators are functionally interconnected such that under operating conditions the actuators move the engagements elements simultaneously until a first one of the actuators reaches a counterforce which is higher than a counterforce of a second one of the actuators, after which the second one of the actuators is moved further.

An advantage of the invention is that all engagement elements will properly engage a pile before a lifting operation is started. The functional interconnection of the actuators creates an automatic gripping control.

In a practical embodiment the actuators comprise hydraulic cylinders including respective pressure chambers, which communicate with each other. When a hydraulic pump provides oil pressure to all of the hydraulic cylinders the engagement elements will be moved simultaneously. As soon as a first one of the engagement elements contacts an inner wall of a tubular pile the corresponding hydraulic cylinder may encounter an increased counterforce. If another one of the engagement elements can still freely move towards the inner wall the corresponding hydraulic cylinder will be moved further since the oil will automatically flow to the pressure chamber which provides a lower back pressure.

Each of the engagement elements may have a wedge shape including an outer side which is directed away from the hoisting member and which extends substantially parallel to the centreline. This means that the outer side can move parallel to the centreline.

In a particular embodiment a flange is mounted to the hoisting member for contacting an upper end of a monopile when at least a portion of the lifting device including the engagement elements is inserted in the monopile. This guarantees a well-defined position of the lifting device in the monopile to be lifted.

Each of the engagement elements may be provided with a resilient cover at a side of the engagement element which faces away from the hoisting member. Such a cover may be made of rubber or the like. The resilient covers provide a proper engaging performance between the engagement elements and the inner wall of the tubular pile. Besides, resilient covers are easy to repair, in case of wear and/or tear. It is noted that the remainder of the engagement element may be made of steel.

The invention is also related to a method of lifting a tubular pile by means of a lifting device which is provided with a hoisting member including a centreline and a plurality of engagement elements which are moveably mounted to the hoisting member at angular distance with respect to each other about the centreline, wherein the engagement elements are moveable in longitudinal direction of the centreline along respective guides of the hoisting member, which guides are inclined with respect to the centreline such that the engagement elements move in radial direction of the centreline when being moved in longitudinal direction of the centreline, wherein the method comprises the steps of inserting the lifting device into the tubular pile, moving the engagement elements simultaneously in a direction in which they also move towards an inner wall of the tubular pile, stopping the movement of a first one of the engagement elements when it generates a counterforce which is higher than a counterforce of a second one of the engagement elements, whereas the second one of the engagement elements is moved further.

The second one of the engagement elements may be stopped when its counterforce achieves a predetermined level. This may be a pre-set maximum allowable level.

The invention will hereafter be elucidated with reference to the schematic drawings showing an embodiment of the invention by way of example.

Figure 1:
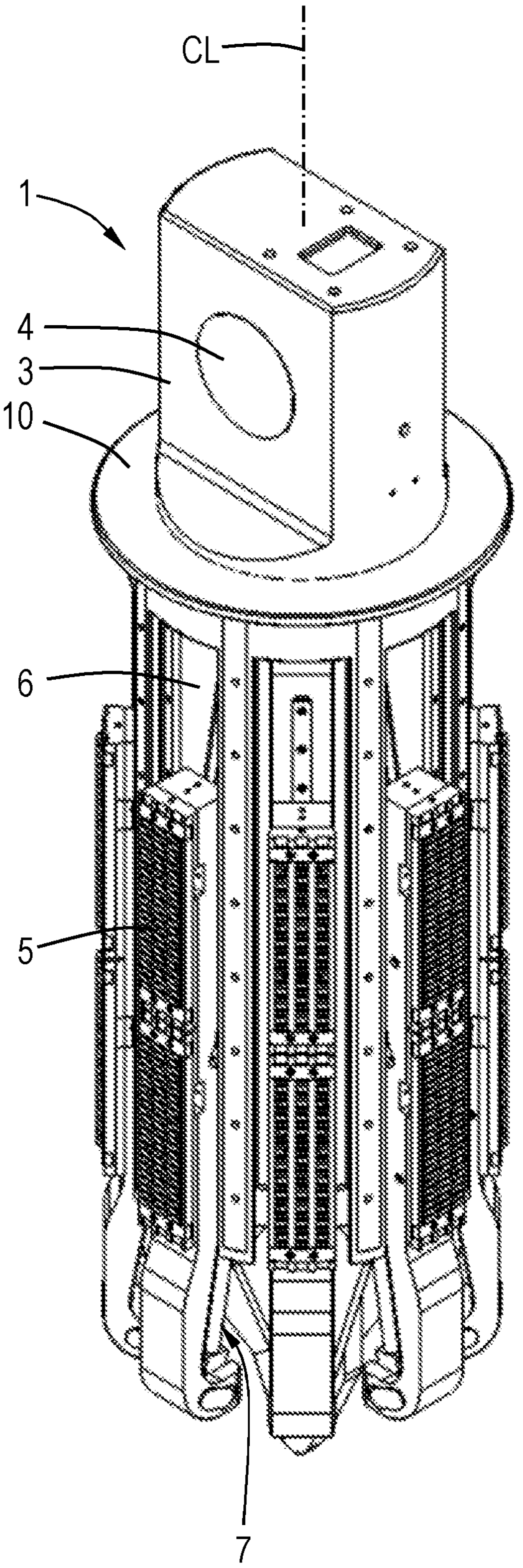
FIG. 1 is a perspective view of an embodiment of a lifting device according to the invention.
Figure 2:
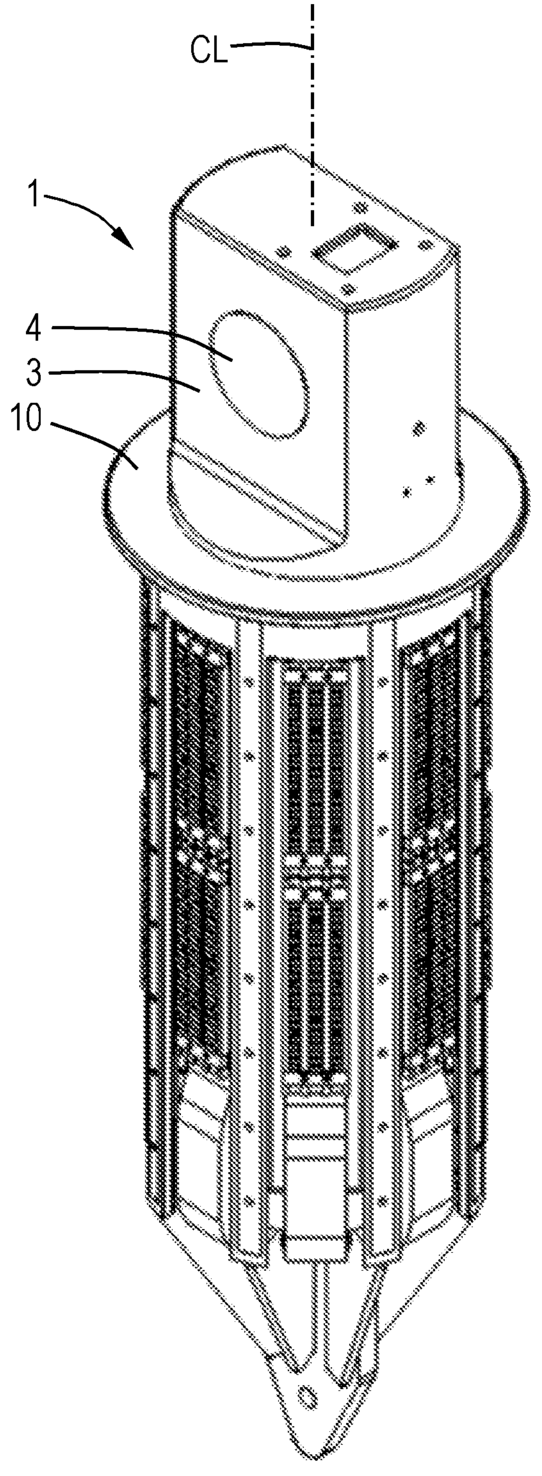
FIG. 2 is a similar view as FIG. 1, but showing the lifting device in a different condition.
Figure 3:
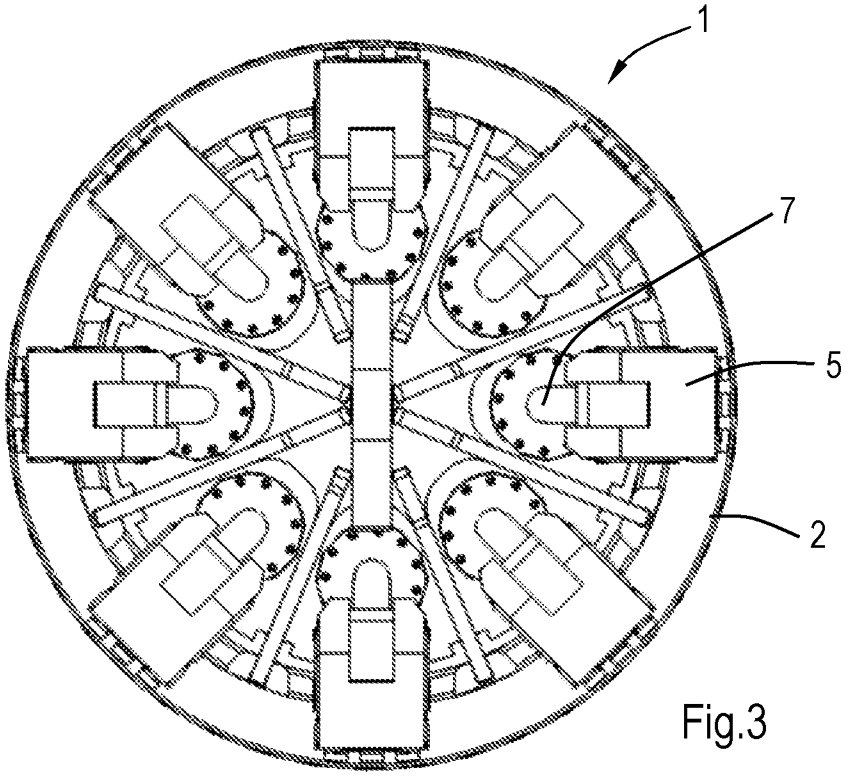
FIG. 3 is a bottom view of the embodiment as shown in FIG. 1.
Figure 4:
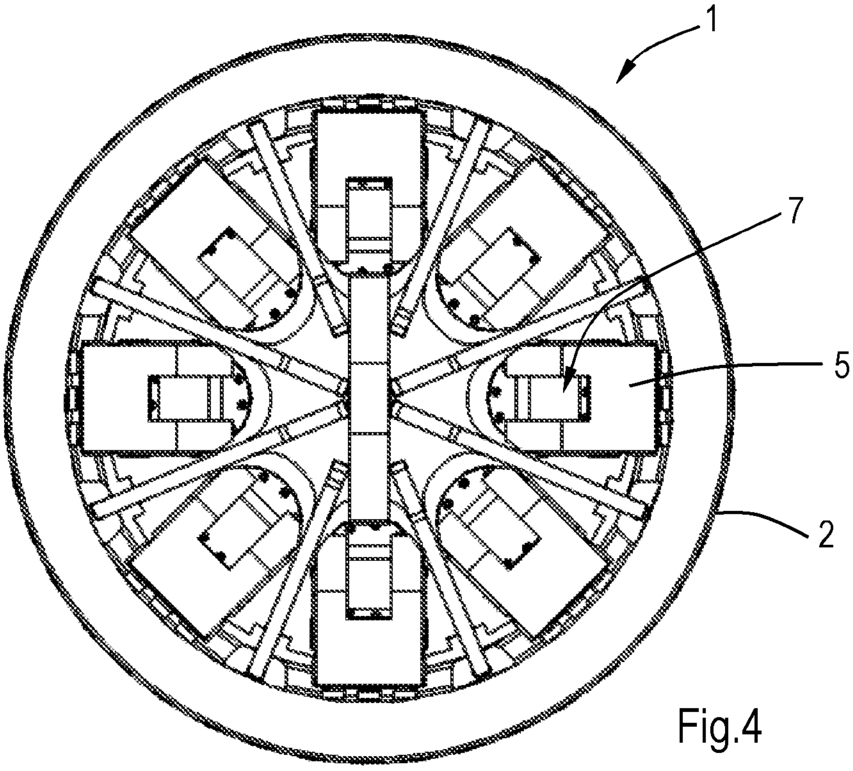
FIG. 4 is a similar view as FIG. 3, but showing the condition of the lifting device as illustrated in FIG. 2.
Figure 5:
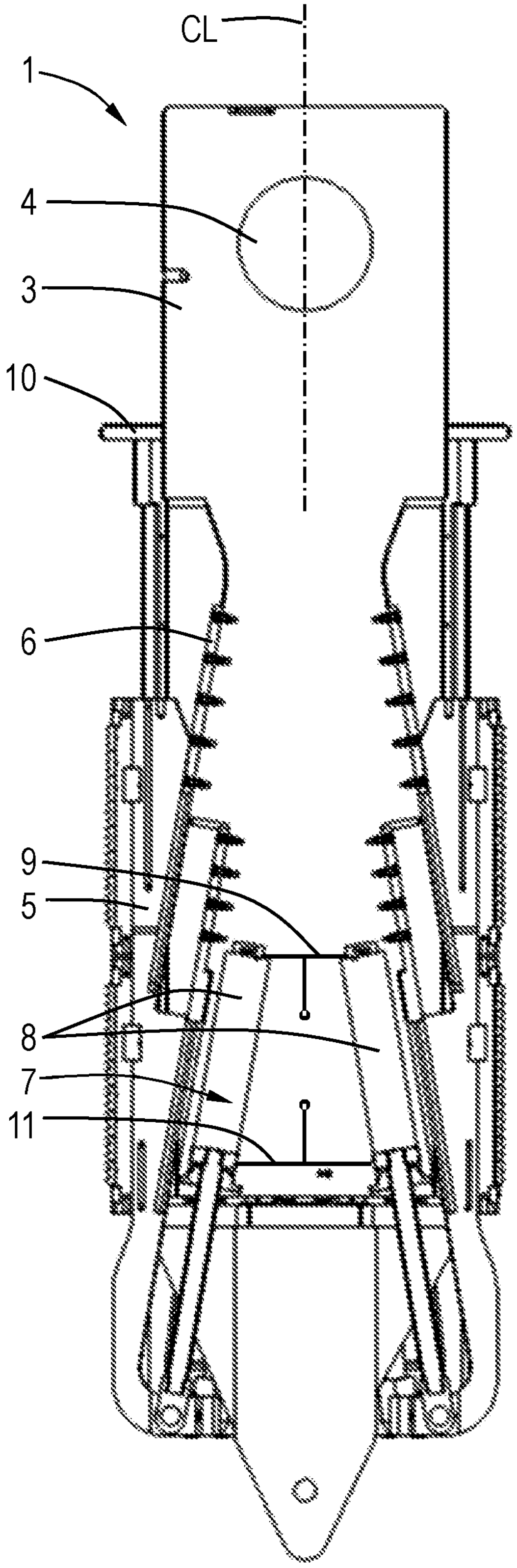
FIG. 5 is a cross-sectional view of the embodiment as shown in FIG. 1.
Figure 6:
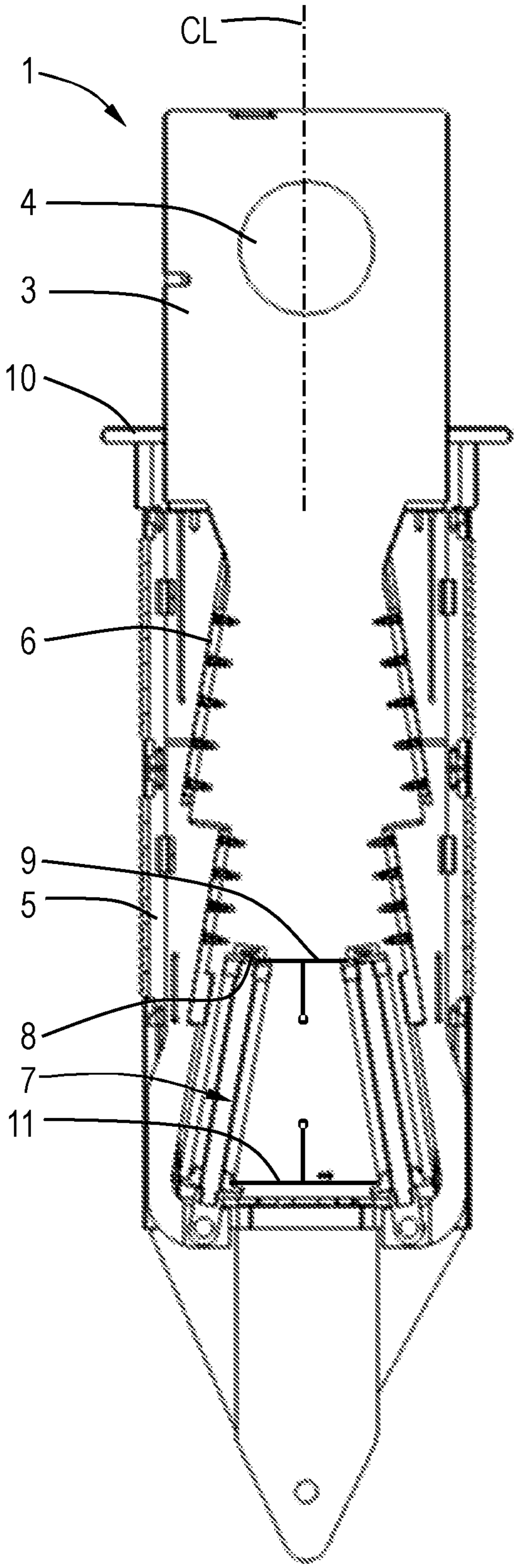
FIG. 6 is a similar view as FIG. 5, but showing the condition of the lifting device as illustrated in FIGS. 2 and 4.

FIGS. 1 and 2 show an embodiment of a lifting device 1 according to the invention in two different conditions. FIGS. 3 and 4 show the bottom side of the lifting device 1 in the respective conditions. FIGS. 5 and 6 provide an internal view of the lifting device in order to illustrate its functioning. The lifting device 1 is intended for being inserted into an upper end of a tubular pile or a monopile 2 in the condition as shown in FIGS. 2, 4 and 6, and being fixed to the monopile 2 in the condition as shown in FIGS. 1, 3 and 5, after which the monopile 2 can be lifted. Such a monopile 2 is, for example, located in the sea bottom and has to be removed from there. For explanatory reasons the monopile 2 is not shown in FIGS. 1, 2, 5 and 6.

The lifting device 1 comprises a hoisting member 3 which is provided with a hoisting eye 4 that can be engaged by a hook of a crane (not shown). The lifting device 1 has eight wedge-shaped engagement elements 5 which are moveably mounted to the hoisting member 3 at an equi-angular distance about a centreline CL of the hoisting member 3. A different number of engagements elements 5 is conceivable. Each of the engagement elements 5 is moveable in longitudinal direction of the centreline CL along respective guides 6 of the hoisting member 3. The guides 6 are inclined with respect to the centreline CL. This forces the engagement elements 5 to move in radial direction of the centreline CL when they are moved in longitudinal direction of the centreline CL. Respective outer sides of the wedge-shaped engagement elements 5 which are directed away from the hoisting member 3 extend substantially parallel to the centreline CL. Hence, the outer sides remain parallel to the centreline CL during moving the engagement elements 5 with respect to the hoisting member 3.

FIGS. 2, 4 and 6 show the condition of the lifting device 1 in which the engagement elements 5 are in their upper positions and FIGS. 1, 3 and 5 show the condition of the lifting device 1 in which the engagement elements 5 are in their lower positions. In the latter condition the engagements elements 5 are located at a larger distance from the centreline CL than in the former condition and they engage an inner wall of the monopile 2, as illustrated in FIG. 3.

The engagement elements 5 can be moved with respect to the hoisting member 3 by actuators in the form of hydraulic cylinders 7 which are mounted to the hoisting member 3 and the respective engagement elements 5. The hydraulic cylinders 7 have inclined orientations with respect to the centreline CL of the hoisting member 3 so as to operate along respective lines which are parallel to the corresponding guides 6. FIG. 6 shows the hydraulic cylinders 7 in retracted condition and FIG. 5 shows the hydraulic cylinders 7 in extended condition. Each of the hydraulic cylinders 7 has a pressure chamber 8 into which oil is pressed when the hydraulic cylinder 7 should be extended. The pressure chambers 8 of all hydraulic cylinders 7 communicate with each other as illustrated by a simplified hydraulic circuit 9 in FIGS. 5 and 6. Consequently, upon applying oil pressure to the hydraulic cylinders 7 for moving the engagement elements 5 in outward direction of the hoisting member 3, the oil pressure in all pressure chambers 8 will be substantially equal. Oil chambers for retracting the hydraulic cylinders 7 also communicate with each other through a hydraulic circuit 11.

The lifting device 1 is also provided with a flange 10 which has a fixed position with respect to the hoisting member 3. This allows the lifting device 1 to rest on the monopile 2 when it is inserted into the monopile 2.

After the lifting device 1 is placed inside the monopile 2 as shown in FIG. 4 all the engagement elements 5 will be moved substantially simultaneously until a first one contacts the inner wall of the monopile 2 which creates a higher counterforce on the corresponding hydraulic cylinder 7 than the remaining engagement elements 5 which are still at a distance from the inner wall of the monopile 2. As a consequence, the remaining engagement elements 5 will be driven further until a next one contacts the inner wall of the monopile 2, and so on. Therefore, in case the monopile 2 is not entirely circular cylindrical the locations of the engagement elements 5 in a direction along the centreline CL in the extended conditions of the hydraulic cylinders 7 may be different.

The invention is not limited to the embodiment shown in the drawings and described hereinbefore, which may be varied in different manners within the scope of the claims and their technical equivalents. For example, the hydraulic cylinders may be replaced by alternative actuators which are functionally interconnected to achieve the same function of the lifting device as described above.

The invention claimed is:

1. A lifting device for lifting a tubular pile, comprising a hoisting member including a centreline, a plurality of engagement elements which are moveably mounted to the hoisting member at an angular distance with respect to each other about the centreline, actuators for moving respective to said engagement elements with respect to the hoisting member, wherein the engagement elements are moveable in a longitudinal direction of the centreline along respective guides of the hoisting member, said guides are inclined with respect to the centreline such that the engagement elements move in a radial direction relative to the centreline when being moved in the longitudinal direction of the centreline, and the actuators are functionally interconnected such that under operating conditions the actuators move the engagements elements simultaneously until a first one of the actuators reaches a counterforce which is higher than a counterforce of a second one of the actuators, after which the second one of the actuators is moved further, and mounted to the hoisting member is a means for contacting an upper end of a monopile when at least a portion of the lifting device including the engagement elements is inserted in the monopile to allow the lifting device to rest on the monopile.

2. The lifting device according to claim 1, wherein the actuators comprise hydraulic cylinders including respective pressure chambers, which communicate with each other.

3. The lifting device according to claim 2, wherein each of the engagement elements has a wedge shape including an outer side which is directed away from the hoisting member and which extends substantially parallel to the centreline.

4. The lifting device according to claim 3, wherein the means for contacting the upper end of the monopile is a flange.

5. The lifting device according to claim 4, wherein each of the engagement elements is provided with a resilient cover at a side of the engagement element which faces away from the hoisting member.

6. The lifting device according to claim 3, wherein each of the engagement elements is provided with a resilient cover at a side of the engagement element which faces away from the hoisting member.

7. The lifting device according to claim 2, wherein the means for contacting the upper end of the monopile is a flange.

8. The lifting device according to claim 7, wherein each of the engagement elements is provided with a resilient cover at a side of the engagement element which faces away from the hoisting member.

9. The lifting device according to claim 2, wherein each of the engagement elements is provided with a resilient cover at a side of the engagement element which faces away from the hoisting member.

10. The lifting device according to claim 1, wherein each of the engagement elements has a wedge shape including an outer side which is directed away from the hoisting member and which extends substantially parallel to the centreline.

11. The lifting device according to claim 10, wherein the means for contacting the upper end of the monopile is a flange.

12. The lifting device according to claim 11, wherein each of the engagement elements is provided with a resilient cover at a side of the engagement element which faces away from the hoisting member.

13. The lifting device according to claim 10, wherein each of the engagement elements is provided with a resilient cover at a side of the engagement element which faces away from the hoisting member.

14. The lifting device according to claim 1, wherein the means for contacting the upper end of the monopile is a flange.

15. The lifting device according to claim 14, wherein each of the engagement elements is provided with a resilient cover at a side of the engagement element which faces away from the hoisting member.

16. The lifting device according to claim 1, wherein each of the engagement elements is provided with a resilient cover at a side of the engagement element which faces away from the hoisting member.

17. A method of lifting a tubular pile by means of a lifting device which is provided with:

a hoisting member including a centreline, a plurality of engagement elements which are moveably mounted to the hoisting member at an angular distance with respect to each other about the centreline, wherein the engagement elements are moveable in a longitudinal direction of the centreline along respective guides of the hoisting member, said guides are inclined with respect to the centreline such that the engagement elements move in a radial direction relative to the centreline when being moved in the longitudinal direction of the centreline, and mounted to the hoisting member is a means for contacting an upper end of a monopile when at least a portion of the lifting device including the engagement elements is inserted in the monopile to allow the lifting device to rest on the monopile, and wherein the method comprises the steps of inserting the lifting device into the tubular pile, moving the engagement elements simultaneously in a direction in which they also move towards an inner wall of the tubular pile, stopping the movement of a first one of the engagement elements when it generates a counterforce which is higher than a counterforce of a second one of the engagement elements, and;

moving the second one of the engagement elements further.

18. The method according to claim 17, wherein the second one of the engagement elements is stopped when the counterforce of the second one of the engagement elements achieves a predetermined level.

* * * * *